(12) United States Patent
Blankenship et al.

(10) Patent No.: US 7,776,975 B2
(45) Date of Patent: Aug. 17, 2010

(54) AQUEOUS POLYMERIZATION PROCESS FOR PREPARING AN AQUEOUS POLYMER DISPERSION

(75) Inventors: Robert Mitchell Blankenship, Harleysville, PA (US); Gary William Dombrowski, West Chester, PA (US); Ralph Craig Even, Blue Bell, PA (US)

(73) Assignee: Rohm and Haas Company, Philadelphia, PA (US)

( * ) Notice: Subject to any disclaimer, the term of this patent is extended or adjusted under 35 U.S.C. 154(b) by 544 days.

(21) Appl. No.: 10/890,572

(22) Filed: Jul. 14, 2004

(65) Prior Publication Data

US 2005/0014883 A1 Jan. 20, 2005

Related U.S. Application Data

(60) Provisional application No. 60/487,523, filed on Jul. 14, 2003.

(51) Int. Cl.
*C08F 2/22* (2006.01)
*C08F 2/40* (2006.01)
*C08F 20/10* (2006.01)

(52) U.S. Cl. ........................................ 526/82; 526/201
(58) Field of Classification Search .................. 526/82, 526/201
See application file for complete search history.

(56) References Cited

U.S. PATENT DOCUMENTS

| 4,254,004 | A |   | 3/1981 | Abbey |         |
|-----------|---|---|--------|-------|---------|
| 5,308,890 | A |   | 5/1994 | Snyder |        |
| 5,324,785 | A | * | 6/1994 | Noda et al. | 525/276 |
| 5,726,259 | A |   | 3/1998 | Hayes et al. |   |
| 6,139,961 | A | * | 10/2000 | Blankenship et al. | 428/402 |
| 6,503,680 | B1 | * | 1/2003 | Chen et al. | 430/137.14 |

FOREIGN PATENT DOCUMENTS

| EP | 0 959 176 A |   | 11/1999 |
|----|-------------|---|---------|
| EP | 0 728 779 B1 |   | 7/2001 |
| EP | 1 197 503 A2 |   | 4/2002 |
| EP | 1197503 A2 | * | 4/2002 |
| WO | WO 01/38412 A1 |   | 5/2001 |
| WO | WO 02/088203 A |   | 11/2002 |
| WO | WO 02/088206 A |   | 11/2002 |

OTHER PUBLICATIONS

ASTM D2805-96a (Reapproved 2003); Standard Test Method For Hiding Power of Paints by Reflectometry; Current Edition approved May 10, 2003, published Jun. 2003, originally approved 1969; Annual Book of ASTM Standards, vol. 06.01; West Conshohocken, PA.

* cited by examiner

*Primary Examiner*—Kelechi C Egwim
(74) *Attorney, Agent, or Firm*—Cantor Colburn LLP

(57) ABSTRACT

The present invention relates to a process for preparing an aqueous polymer dispersion containing polymer particles dispersed in an aqueous medium. The process includes providing first polymer particles; adding a hydrophobic polymerization blocker or a styrenic monomer polymerization blocker to the aqueous medium containing the first polymer particles; and preparing second polymer particles in the presence of the first polymer particles. The aqueous polymer dispersion contain first polymer particles and the second polymer that differ according to at least one attribute such as particle diameter, molecular weight, composition, glass transition temperature, or morphology; or contain polymer particles having a broad polydispersity. The aqueous polymer dispersion prepared by the process of this invention is useful in a wide range of applications, including paints, adhesive, binders for nonwovens, and binders for paper coatings.

20 Claims, No Drawings

AQUEOUS POLYMERIZATION PROCESS FOR PREPARING AN AQUEOUS POLYMER DISPERSION

CROSS REFERENCE TO RELATED PATENT APPLICATIONS

This is a non-provisional application of prior pending U.S. provisional application Ser. No. 60/487,523 filed Jul. 14, 2003.

This invention generally relates to a process for preparing an aqueous polymer dispersion containing polymer particles dispersed in an aqueous medium. The process includes the use of certain materials such as a hydrophobic polymerization blocker or a styrenic monomer polymerization blocker. The process is useful for preparing an aqueous polymer dispersion containing at least two different types of polymer particles. The two different types of polymer particles differ by at least one attribute, such as particle diameter, molecular weight, composition, glass transition temperature, or morphology. The process of this invention is also useful for preparing an aqueous polymer dispersion having a broad distribution of particles sizes. Also provided is an aqueous polymer dispersion prepared by the process of this invention. The aqueous polymer dispersion prepared by the process of this invention is useful in a wide range of applications, including paints, adhesives, binders for nonwovens, and binders for paper coatings.

Aqueous polymer dispersions, which contain polymer particles dispersed in an aqueous medium, are used in a wide variety of commercial applications, including coating formulations such as paints, textile and nonwovens binders, ink formulations, leather, paper coating formulations, and adhesives. In many applications, the formulations are prepared with at least two different types or modes of polymer particles in order to optimize desired properties or to provide higher solids formulations. For example, a high solids formulation may be prepared containing a first mode of polymer particles with an average diameter of 300 nanometers (nm) and a second mode of polymer particles with an average diameter of 80 nm. In another example, a formulation may be prepared containing a first mode of polymer particles with a polymer composition having a glass transition temperature of −10° C. and a second mode of polymer particles having a polymer composition of 50° C.

Aqueous polymer dispersions containing two or more modes of polymer particles are typically prepared by polymerizing each mode of polymer particles separately and then blending the two modes in the desired proportions. The method of blending preformed polymer dispersions has the disadvantages of requiring two or more separate emulsion polymerizations, separate storage of the each of the polymer modes prior to blending, and an additional blending step to combine the individual preformed polymer dispersions containing the different modes of polymer particles. A further disadvantage is that the solids level of the blended aqueous polymer dispersion is limited to a weighted average of the solids levels of the preformed polymer dispersions.

Aqueous polymer dispersions containing polymer particles having bimodal particle diameter distributions may be prepared by various emulsion polymerization processes. For example, an aqueous polymer dispersion having a bimodal particle diameter distribution may be prepared by polymerizing a first mode of polymer particles, adding surfactant or seed polymer particles suitable to initiate a second mode of polymer particles, and then polymerizing monomer to prepare the second mode of polymer particles. The diameters of the first and second modes of polymer particles are controlled by surfactant level, surfactant type, number of seed particles, or other synthesis parameters. One limitation of this type of process is that in the preparation of the second mode of polymer particles, monomer polymerization is not localized to the growing second mode of polymer particles. Polymerization may also occur on or in the first mode of polymer particles, increasing the diameter or altering the composition of the first mode of polymer particles. Such polymerization processes are not readily suitable for preparing aqueous polymer dispersions containing two or more modes of polymer particles that differ by composition, molecular weight, or particle morphology.

WO 0138412 discloses an aqueous emulsion of a polymodal multistage polymeric material containing: (i) polymers of at least two polymerization stages having a glass transition temperature difference of at least 20° C.; (ii) polymers of at least two polymerization stages having a particle diameter difference of at least 50 nm; and (iii) the means to form at least one of the differing glass transition temperatures in (i) and at least one of the differing particle diameters in (ii) are carried out in different stages of the multistage polymerization to form the polymeric material. The aqueous emulsion of polymer of the polymodal multistage polymer material is prepared by a process that includes a first aqueous emulsion polymerization stage for forming first stage polymer; a stage for forming polymer with a smaller particle diameter than the first stage polymer; and stage for polymerizing monomer to form polymer having different glass transition temperature than the immediately prior stage. This polymerization process requires at least three separate polymerization steps and is suitable for preparing only select compositions, such as compositions containing large polymer particles and small polymer particles, wherein either the small or the large polymer particles contain polymers having differing glass transition temperatures.

Desired in the art are facile processes for preparing an aqueous polymer dispersion containing at least two disparate modes of polymer particles. Disparate modes refers to populations of polymer particles that differ by at least one characteristic attribute such as glass transition temperature, average particle diameter, molecular weight, average polymer composition, or particle morphology.

The inventors have discovered a process that allows the preparation of aqueous polymer dispersions containing at least two disparate modes of polymers. The process is suitable, for example, for the preparation of aqueous polymer dispersions having two or more polymer particle modes with different compositions, molecular weights, or glass transition temperatures, wherein the two or more polymer modes have similar average particle diameters. Further, the polymerization process of this invention is suitable for preparing high solids aqueous polymer dispersions containing two or more modes of polymer particles differing in average particle diameter and optionally another characteristic attribute such as polymer composition or molecular weight. The inventors have also discovered that the process is suitable for the preparation of aqueous polymer dispersions having a broad particle size distribution.

According to the first aspect of the present invention, a process is provided for preparing an aqueous polymer dispersion containing at least two disparate modes of polymer particles, including: providing a first polymer dispersion containing a first mode of first polymer particles dispersed in an aqueous medium; adding a hydrophobic polymerization blocker to the first polymer dispersion; and polymerizing ethylenically unsaturated monomer in the presence of the first polymer particles to provide a second mode of second polymer particles; wherein the first mode and the second mode are the at least two disparate modes.

A second aspect of the present invention provides a process for preparing an aqueous polymer dispersion containing at least two disparate modes of polymer particles, including: providing a first polymer dispersion containing a first mode of first polymer particles dispersed in an aqueous medium; adding a styrenic monomer polymerization blocker selected from styrene or ring-substituted styrene having a water solubility of less than 0.05 g/100 milliliters of water to the first polymer dispersion; and adding ethylenically unsaturated monomer to first polymer dispersion, wherein the ethylenically unsaturated monomer contains from 0 to 20 weight % styrene or ring-substituted styrene, based on weight of the ethylenically unsaturated monomer; polymerizing the ethylenically unsaturated monomer in the presence of the first polymer particles to provide a second mode of second polymer particles; wherein the first mode and the second mode are the at least two disparate modes.

A third aspect of the present invention provides a process for preparing an aqueous polymer dispersion including: adding first ethylenically unsaturated monomer to an aqueous medium; polymerizing the first ethylenically unsaturated monomer in the aqueous medium to prepare first polymer particles; adding concurrently a hydrophobic polymerization blocker and second ethylenically unsaturated monomer to the aqueous medium; and polymerizing the second ethylenically unsaturated monomer in the aqueous medium to prepare second polymer particles; wherein the aqueous polymer dispersion has a particle diameter distribution with a polydispersity of at least 1.5.

As used herein, the use of the term "(meth)" followed by another term such as acrylate refers to both acrylates and methacrylates. For example, the term "(meth)acrylate" refers to either acrylate or methacrylate; the term "(meth)acrylic" refers to either acrylic or methacrylic; the term "(meth)acrylonitrile" refers to either acrylonitrile or methacrylonitrile; and the term "(meth)acrylamide" refers to either acrylamide or methacrylamide.

"Glass transition temperature" or "$T_g$" as used herein, means the temperature at or above which a glassy polymer will undergo segmental motion of the polymer chain. Glass transition temperatures of a polymer can be estimated by the Fox equation [*Bulletin of the American Physical Society* 1, 3 Page 123 (1956)] as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, and $T_{g(1)}$ and $T_{g(2)}$ refer to the glass transition temperatures of the two corresponding homopolymers in Kelvin. For polymers containing three or more monomers, additional terms are added ($w_n/T_{g(n)}$). The $T_g$ of a polymer phase can also be calculated by using the appropriate values for the glass transition temperatures of homopolymers, which may be found, for example, in "Polymer Handbook", edited by J. Brandrup and E. H. Immergut, Interscience Publishers. The values of $T_g$ reported herein are calculated using the Fox equation.

As used herein, the term "dispersion" refers to a physical state of matter that includes at least two distinct phases, wherein a first phase is distributed in a second phase, with the second phase being a continuous medium. An aqueous polymer dispersion is a dispersion containing a first phase distributed in an aqueous second phase that is predominately water and may contain minor amounts of water soluble or water miscible liquids, such as lower alkyl alcohols, ketones, or glycols.

In the first aspect of the present invention, a process is provided for preparing an aqueous polymer dispersion containing at least two disparate modes of polymer particles. The process includes providing a first mode of first polymer particles dispersed in an aqueous medium; adding a hydrophobic polymerization blocker to the first polymer dispersion; and polymerizing ethylenically unsaturated monomer in the presence of the first polymer particles to provide a second mode of second polymer particles. The resulting aqueous polymer dispersion contains at least two different modes of polymer particles that differ according to at least one physical or chemical attribute.

As used herein, a mode refers to a population of polymer particles having a set of defining characteristics, such as physical properties, chemical composition, and morphology. Examples of physical properties include particle diameter, density, surface functional groups such as acid groups, glass transition temperature, and molecular weight. Examples of chemical composition include the average content of polymerized monomers contained in the polymer particles, the random arrangement of polymerized monomers as contained in random copolymers, comb graft polymers, the inclusion of polymer units of a select ethylenically unsaturated monomer in one mode of polymer particles but not in the second mode of polymer particles, and the arrangement of polymerized monomers in block copolymers, such as size of blocks or sequencing of blocks. Examples of polymer morphology include single phase polymer particles, core-shell polymer particles such as particles having one or more polymer shells that either fully or partially encapsulate a polymer core, polymer particles having a continuous phase of a first polymer with multiple domains of a second polymer, interpenetrating network polymers, polymer particles having one or more internal voids, macroreticulated particles having one or more internal voids and at least one channel connecting a void with the exterior surface of the polymer particles, and polymer particles having one or more polymer lobes attached to center polymer particles.

The aqueous polymer dispersion containing at least two disparate modes refers to an aqueous polymer dispersion having at least two different populations of polymer particles, wherein each mode of polymer particles has a set of defining characteristics, and differ from the other mode(s) by at least one defining characteristic. The following examples provide illustrations of aqueous polymer dispersions having disparate modes of polymer particles.

(a) The first mode of the first polymer particles has an average diameter of 250 nm and the second mode of the second polymer particles has an average diameter of 80 nm. The polymer compositions of the first mode and the second mode are identical.

(b) The first mode of the first polymer particles has a weight average molecular weight of 500,000 Daltons and the second mode of the second polymer particles has a weight average molecular weight of 10,000 Daltons. The compositions of the first mode and the second mode are identical.

(c) The first mode of the first polymer particles has a glass transition temperature of 55° C. and the second mode of the second polymer particles has a glass transition temperature of −10° C.

(d) The first mode of the first polymer particles is a random copolymer containing as polymerized units, 57 weight % methyl methacrylate, 40 weight % butyl acrylate, and 3 weight % methacrylic acid, based on the weight of the first polymer particles; and has a glass transition temperature of 21° C. The second mode of the second polymer particles is a random copolymer containing as polymerized units, 68 weight % methyl methacrylate, 29 weight % 2-ethylhexyl acrylate, and 3 weight % methacrylic acid, based on the weight of the second polymer particles; and has a glass transition temperature of 21° C.

(e) The first mode of the first polymer particles is a random copolymer containing as polymerized units, 57 weight % methyl methacrylate, 40 weight % butyl acrylate, and 3 weight % methacrylic acid, based on the weight of the first polymer particles; and has a glass transition temperature of 21° C. The second mode of the second polymer particles contains core-shell polymer particles, each having a core containing as polymerized units, 29 weight % methyl methacrylate, 6 weight % butyl acrylate, and 0.5 weight % methacrylic acid; and a shell containing as polymerized units, 28 weight % methyl methacrylate, 34 weight % butyl acrylate, and 2.5 weight % methacrylic acid, wherein the weight % of each monomer is based on the weight of the second polymer particles. The core and the shell of the second polymer particles have glass transition temperatures of 64° C. and −2° C., respectively. The polymer particles of the first mode and the second mode have different particle morphologies but identical average polymer compositions.

(f) The first mode has first polymer particles, which are copolymer particles formed from 70 weight % ethyl acrylate, 15 weight % methyl methacrylate, 10 weight % hydroxyethyl methacrylate, and 5 weight % methyl acrylate, have a number average molecular of 100,000 Daltons, and an average particle diameter of 150 nm. The second mode has second polymer particles, which are copolymer particles formed from 70 weight % butyl acrylate, 27 weight % styrene, and 3 weight % acrylic acid, have a number average molecular of 35,000 Daltons, and an average particle diameter of 325 nm.

(g) The first mode of the first polymer particles has an average particle diameter of 230 nm, the second mode of the second polymer particles has an average particle diameter of 70 nm, and the third mode of third polymer particles has an average diameter of 400 µm.

(h) The first mode of the first polymer particles are formed from butyl acrylate, methyl methacrylate, and methacrylic acid. The second mode of the second polymer particles are formed from butyl acrylate, methyl methacrylate, methacrylic acid, and acetoacetoxy ethyl methacrylate. The compositions of the first mode and the second mode are disparate because the second polymer particles includes polymerized units of acetoacetoxy ethyl methacrylate, while the first polymer particles are absent polymerized units of acetoacetoxy ethyl methacrylate.

The process of the first aspect of this invention includes the step of providing a first polymer dispersion containing the first mode of first polymer particles dispersed in an aqueous medium. The first polymer particles may be addition polymers formed by the polymerization of one or more ethylenically unsaturated monomers, condensation polymers, or hybrid polymers containing both condensation polymer and addition polymer. Condensation polymer are polymers that are not formed by the reaction of ethylenically unsaturated monomers, and include, for example, polyurethanes, polyureas, polyesters, polyamides, alkyds, polycarbonates, polysilicones such as the condensation product of hexamethylcyclotrisiloxane ($D_3$); octamethylcyclotetrasiloxane ($D_4$), and decamethylcyclopentasiloxane ($D_5$); polyalkyl oxides such as polyethylene oxide; polyimides; polysulfones; polyacetals; and biopolymers such as polyhydroxy alkanoates, polypeptides, and polysaccharides. The first polymer particles may contain two or more polymer compositions or phases, and include core-shell polymer particles and polymer particles having one polymer phase dispersed as small domains within the other polymer phase. The first mode of first polymer particles may be prepared prior to or as a step in the process of the present invention. First polymer particles that are addition polymers may be prepared by any polymerization technique that provides polymerization of ethylenically unsaturated monomers, such as emulsion polymerization, suspension polymerization, or solution polymerization followed by the conversion of the solution polymer to polymer particles by various methods known in the art. Suitable polymerization processes to prepare the first polymer dispersion containing the first polymer particles, which include emulsion polymerization, suspension polymerization, and solution polymerization processes, are typically conducted as batch, semicontinuous, or continuous processes. The first polymer dispersion containing the first mode may be provided with from 0.1 to 60 weight % solids of first polymer particles, based on the weight of the first polymer dispersion.

After the step of providing the first polymer dispersion containing the first mode of the first polymer particles dispersed in an aqueous medium, a hydrophobic polymerization blocker is added to the first polymer dispersion. The hydrophobic polymerization blocker is a material that minimizes the rate of polymerization or prevents polymerization of the ethylenically unsaturated monomer. The hydrophobic polymerization blocker may prevent free radical polymerization by combining with and removing free radicals, resulting in the termination of free radical reactions; or by combining with reactive free radicals to form stable free radicals having low reactivity.

The ability of a material to function as the hydrophobic polymerization blocker in the process of this invention is ascertained by the following test method, which compares polymerization in the presence and in the absence of the hydrophobic polymerization blocker. In the first sample, 20 grams of the ethylenically unsaturated monomer that is to be polymerized in the presence of the first polymer particles, is added to a pressure vessel with 0.02 grams of di-t-butylperoxide. The vessel is purged with nitrogen gas for 15 minutes, sealed, and then maintained at a temperature of 150° C. for a period of one hour. The contents of the vessel are immediately cooled to room temperature and then discharged into a volume of ice cold methanol that is 20 times the volume of the monomers. The resulting polymer solids are vacuum filtered on a 70 to 100 micron sintered glass funnel (Ace Glass, medium flow type B), dried, and weighed to determine the weight of polymer formed. The same procedure is employed in the second sample except that 0.4 grams of the material to be tested as the hydrophobic polymerization blocker is also added. A polymer yield of the second sample that is less than 90 weight % of the polymer yield of the first sample indicates that the tested material is a hydrophobic polymerization blocker.

Examples of hydrophobic polymerization blockers include polymerization inhibitors, polymerization retarders, and hydrophobic chain transfer agents. Polymerization inhibitors are materials that prevent polymerization by terminating free radical reactions, and include, for example, N-oxide radicals such as 2,2,6,6-tetramethyl-1-piperidinyloxy free radical and 2,6-di-tert-butyl-α-(3,5-di-tert-butyl-4-oxo-2,5-cyclohexadien-1-ylidene)$_p$-tolyloxy, free radical (galvinoxyl free radical); phenol; alkyl phenol; catechols, polyaromatics such as naphthalene, anthracene, and pyrene; substituted polyaromatics such as hydroxynaphthalene and hydroxyanthracene; p-benzoquinone, and p-naphthaquinone. Polymerization retarders are materials that reduce the rate of free radical reactions, and include, for example, esters of unsaturated fatty acids such as alkyl, hydroxy alkyl, or alkoxy esters of linoleic or linolenic acid; $C_1$ to $C_{12}$ derivatives of dithiobenzoic acid such as dithiobenzoic acid phenyl ester, dithiobenzoic acid benzyl ester, dithiobenzoic acid cumyl ester, and inhibitory monomers. Inhibitory monomers are ethylenically unsaturated monomers that have a ceiling temperature that is below the polymerization temperature of the ethylenically unsaturated monomers or is capable of radical capture without sustantial subsequent polymerization. The ceiling temperature is the temperature at which the rate of polymerization equals the rate of depolymerization for a monomer. Examples of inhibitory monomers include 1-alkyl styrenes such as a-methyl styrene; 1-aryl styrenes such as 1,1-diphenylethylene; 2-alkyl or 2-aryl styrenes such as stilbene and 1-phenylpentene; alkyl vinyl ethers; aryl vinyl ethers; trans-crotonitrile; trans-1,2-diphenylethylene; trans-1,2-dibenzoylethylene; trans-1,2-diacetylethylene; methyl 2-tert-butylacrylate; 1-isopryenylnaphthalene; α-stilbazole; 2,4-dimethyl α-methyl styrene; isoprenyltoluene; and half or full esters of itaconic acid, maleic acid, fumaric acid, and crotonic acid. Hydrophobic chain transfer agents include, for example, n-dodecyl mercaptan, 1,4-cyclohexadiene, terpineol, carbon tetrachloride, trichloromethane, benzyl halides; allyl halides, and crotyl halide. One or more polymerization blockers may be added to the aqueous medium. Examples of ranges of hydrophobic polymerization blocker that are suitable in the process of this invention include 0.1 to 10 weight %, 0.2 to 5 weight %, and 0.5 to 3 weight %, based on the weight of the first polymer particles.

After addition of the hydrophobic polymerization blocker, one or more ethylenically unsaturated monomers are polymerized in the presence of the first polymer particles to provide a second mode of second polymer particles. The ethylenically unsaturated monomer may be added prior to, during, or after the addition of the hydrophobic polymerization blocker. Preferably, the hydrophobic polymerization blocker is added prior to the addition of the ethylenically unsaturated monomer used to form the second polymer particles. The hydrophobic polymerization blocker may be added neat, as an emulsion such as a homogenized aqueous emulsion, or as a solution in solvent.

While not being bound by theory, it is believed that in the process of the present invention, the hydrophobic polymerization blocker partitions from the aqueous medium into the first polymer particles. The hydrophobic polymerization blocker has a water solubility that is sufficiently low that the hydrophobic polymerization blocker is predominately located in the first polymer particles with minor amounts in the aqueous medium. The presence of the hydrophobic polymerization blocker in the first polymer particles is believed to minimize or to eliminate the polymerization of the ethylenically unsaturated monomer in or on the first polymer particles. The subsequent aqueous polymerization of ethylenically unsaturated monomer in the presence of the first polymer particles that contain the hydrophobic polymer inhibitor within, is believed to lead predominately to the formation of a second mode of second polymer particles in the aqueous medium, with only minor or no polymerization in or on the first polymer particles.

In one embodiment, the hydrophobic polymerization blocker useful in the process of the invention has a water solubility of less than 1 g/100 milliliter (g/100 ml) water, preferably less than 0.5 g/100 ml water, more preferably, less than 0.1 g/100 ml, still more preferably less than 0.05 g/100 ml water, and most preferably less than 0.01 g/100 ml water at a temperature of 25° C.

In a different embodiment, at least 75 weight %, preferably at least 90 weight %, and more preferably at least 95 weight % of the hydrophobic polymerization blocker is contained in the first polymer particles at the polymerization temperature of the ethylenically unsaturated monomers, based on the total amount of the hydrophobic polymerization blocker added. Further, in this embodiment, the aqueous medium contains less than 25 weight %, preferably less than 10 weight %, and more preferably less than 5 weight % of the hydrophobic polymerization blocker at the polymerization temperature of the ethylenically unsaturated monomers in the presence of the first polymer particles, based on the total amount of hydrophobic polymerization blocker added. The partitioning of the hydrophobic polymerization blocker between the aqueous medium and the first polymer particles may be determined by removing aliquots of the aqueous dispersion, removing the first polymer particles by centrifugation, and measuring the concentration of the hydrophobic polymerization blocker remaining in the aqueous medium by a suitable technique, such as liquid chromatography, infrared spectroscopy, ultraviolet spectroscopy, or nuclear magnetic resonance spectroscopy.

Typically, the hydrophobic polymerization blocker is allowed at least 1 minutes, preferably at least 2 minutes, and more preferably 5 minutes after addition to partition into the first polymer particles prior to the initiation of polymerization of the ethylenically unsaturated monomer. Mixing is commonly employed to minimize localized concentrations of the hydrophobic polymerization blocker in the aqueous medium. Optionally, a material may be added to aid in the transport of the hydrophobic polymerization blocker through the aqueous medium. Examples of such materials include surfactants and macromolecular organic compounds having a hydrophobic cavity, which include cyclodextrin, cyclodextrin derivatives, cycloinulohexose, cycloinuloheptose, cycloinulocotose, calyxarene, and cavitand. Cyclodextrin includes α-cyclodextrin, β-cyclodextrin, and γ-cyclodextrin. Cyclodextrin derivatives refers to α-cyclodextrins, β-cyclodextrins, and γ-cyclodextrins in which at least one hydroxyl group located on the rim of the cyclodextrin ring have been functionalized with a substituent group such as methyl, acetyl, hydroxypropyl, and hydroxyethyl groups. Cyclodextrin derivatives also include cyclodextrin molecules with multiple substituent groups including cyclodextrin molecules with more than one type of substituent group. Cyclodextrin derivatives do not include polymers with more than one attached cyclodextrin ring. Preferred cyclodextrin derivatives are methyl-α-cyclodextrin and hydroxypropyl-β-cyclodextrin. Methyl-β-cyclodextrin is the most preferred cyclodextrin derivative. The amount of macromolecular organic compound having a hydrophobic cavity optionally used in the process disclosed in U.S. Pat. No. 5,521,266 is typically from 0.1 to 50 weight percent, preferably 0.1 to 30 weight percent, and more preferably 0.5 to 10 weight percent based on the total weight of hydrophobic polymerization blocker. Other suitable materials to aid in the transport of the hydrophobic polymerization blockers are non-cyclical polysaccharide capable of forming an inclusion compound, as disclosed in WO 98/24821 A2. Suitable non-cyclical polysaccharides include both unmodified polysaccharides and modified polysaccharides which are partially or totally derivatized on the hydroxyl groups.

The ethylenically unsaturated monomer is polymerized in the presence of the first polymer particles by emulsion polymerization to form the second mode of the second polymer particles. The practice of emulsion polymerization is discussed in detail in D. C. Blackley, *Emulsion Polymerization* (Wiley, 1975). Conventional emulsion polymerization techniques may be used to prepare the second polymer particles as an aqueous polymer dispersion of polymer particles, as well as to prepare the first polymer particles. The practice of emulsion polymerization is also discussed in H. Warson, *The Applications of Synthetic Resin Emulsions*, Chapter 2 (Ernest Benn Ltd., London 1972).

The formation of the second mode of second polymer particles may be aided by the addition of seed polymers, surfactant, miniemulsion, or pH adjusting agents such as buffers. Miniemulsions are well known in the art as oil-in-water dispersions, with droplet diameter below 1 micron, that are stable for a period ranging from hours to months. Within the context of this invention, the droplets of the miniemulsion contain ethylenically unsaturated monomers and other optional components as needed to provide stable sub-micron droplets. These other optional components include compounds of very low water solubility and are referred in the art as co-surfactants, co-stabilizers, or hydrophobes. Typical hydrophobes include higher alkanes such as hexadecane, hydrophobic alcohols such as cetyl alcohol, very hydrophobic monomers such as stearyl methacrylate, and polymers. Miniemulsions are typically formed under high shear through the use of rotor-stator devices, sonifiers, and high pressure homogenizers. Miniemulsions are typically made using surfactants. Description of mini-emulsions and their use in emulsion polymerization can be found in "Miniemulsion Polymerization" by J. M. Asua in *Progress in Polymer Science*, Volume 27, Pages 1283-1346 (2002).

Prior to addition to the aqueous medium, the ethylenically unsaturated monomers may be emulsified in water with an anionic or nonionic dispersing agent, also referred to as a surfactant, using for example from 0.05 to 10% by weight of dispersing agent on the weight of total monomers. Combinations of anionic and nonionic dispersing agents may also be used. Optionally, a copolymerizable surfactant having at least one polymerizable ethylenically unsaturated bond may be employed.

Suitable anionic dispersing agents include, for example, the higher fatty alcohol sulfates, such as sodium lauryl sulfate; alkylaryl sulfonates such as sodium or potassium isopropylbenzene sulfonates or isopropyl naphthalene sulfonates; alkali metal higher alkyl sulfosuccinates, such as sodium octyl sulfosuccinate, sodium N-methyl-N-palmitoyl-laurate, sodium oleyl isothionate; alkali metal salts and ammonium salts of alkylarylpolyethoxyethanol sulfates, sulfonates, or phosphates, such as sodium tert-octylphenoxy-polyethoxyethyl sulfate having 1 to 50 oxyethylene units; alkali metal salts and ammonium salts of alkyl polyethoxy-ethanol sulfates, sulfonates, and phosphates; and alkali metal salts and ammonium salts of aryl polyethoxyethanol sulfates, sulfonates, and phosphates.

Suitable nonionic dispersing agents include alkylphenoxy-polyethoxyethanols having alkyl groups of from about 7 to 18 carbon atoms and from about 6 to about 60 oxyethylene units, such as heptylphenoxypolyethoxyethanols, methyloctyl phenoxypolyethoxyethanols; polyethoxyethanol derivatives of methylene-linked alkyl phenols; sulfur-containing agents such as those made by condensing from about 6 to 60 moles of ethylene oxide with nonyl mercaptan, dodecyl mercaptan, or with alkylthiophenols wherein the alkyl groups contain from 6 to 16 carbon atoms; ethylene oxide derivatives of long chained carboxylic acids, such as lauric acid, myristic acid, palmitic acid, oleic acid, or mixtures of acids such as those found in tall oil containing from 6 to 60 oxyethylene units per molecule; analogous ethylene oxide condensates of long chained alcohols such as octyl, decyl, lauryl, or cetyl alcohols, ethylene oxide derivatives of etherified or esterified polyhydroxy compounds having a hydrophobic hydrocarbon chain, such as sorbitan monostearate containing from 6 to 60 oxyethylene units; block copolymers of ethylene oxide section combined with one or more hydrophobic propylene oxide sections. Mixtures of alkyl benzenesulfonates and ethoxylated alkylphenols may be employed.

The emulsion polymerization process may be a thermal or redox type; that is, free radicals may be generated solely by the thermal dissociation of an initiator species or a redox system may be used. A polymerization initiator of the free radical type, such as ammonium or potassium persulfate, may be used alone or as the oxidizing component of a redox system, which also includes a reducing component such as potassium metabisulfite, sodium thiosulfate, or sodium formaldehyde sulfoxylate. The reducing component is frequently referred to as an accelerator. The initiator and accelerator, commonly referred to as catalyst, catalyst system, or redox system, may be used in proportion from about 0.01% or less to 3% each, based on the weight of monomers to be polymerized. Examples of redox catalyst systems include t-butyl hydroperoxide/sodium formaldehyde sulfoxylate/Fe(II) and ammonium persulfate/sodium bisulfite/sodium hydrosulfite/Fe(II). Other suitable initiators include azo compounds. The polymerization temperature may be from 10° C. to 90° C., or more, and may be optimized for the catalyst system employed, as is conventional. Emulsion polymerization may be seeded or unseeded.

A monomer emulsion containing all or some portion of the monomers to be polymerized may be prepared using the monomers, water, and surfactants. A catalyst solution containing catalyst in water may be separately prepared. The monomer emulsion and catalyst solution may be cofed into the polymerization vessel over the course of the emulsion polymerization. The reaction vessel may also additionally contain seed emulsion and further may additionally contain an initial charge of the polymerization catalyst. The temperature of the reaction vessel during the emulsion polymerization may be controlled by cooling to remove heat generated by the polymerization reaction or by heating the reaction vessel. Several monomer emulsions may be simultaneously cofed into the reaction vessel. When multiple monomer emulsions are cofed, they may be of different monomer compositions. The sequence and rates at which the different monomer emulsions are cofed may be altered during the emulsion polymerization process. For example, the rates of addition of the different monomer emulsions may be altered independently. The pH of the contents of the reaction vessel may also be altered during the course of the emulsion polymerization process.

The emulsion polymerization of the second polymer particles may be conducted in the presence of one or more surfactants to aid in the stabilization of the growing second polymer particles during polymerization or to discourage aggegration of polymer particles in the aqueous polymer dispersion. Examples of suitable surfactants include the anionic and nonionic dispersing agents listed hereinabove. Other materials suitable for stabilizing polymer particles during or after polymerization include high molecular weight polymers such as hydroxy ethyl cellulose, methyl cellulose, and vinyl alcohol; and polyelectrolytes such as polyacrylic acid.

Typically, the second mode of the second polymer particles contains at least 50 weight %, preferably at least 75 weight %, more preferably at least 90 weight %, and most preferably 95 weight %, of the ethylenically unsaturated monomer polymerized in the presence of the first polymer particles. Minor amounts of ethylenically unsaturated monomer may polymerize onto or in the first polymer particles, resulting in slight increases in the diameter of the first polymer particles, or minor changes to the polymer composition of the first polymer particles. Minor amounts refer to less than 50 weight %, preferably less than 25 weight %, more preferably less than 10 weight %, and most preferably less than 5 weight % based on the weight of the ethylenically unsaturated monomer polymerized in the presence of the first polymer particles.

In one embodiment, the hydrophobic polymerization blocker and at least 25 weight %, preferably at least 50 weight %, and more preferably at least 75 weight % of the ethylenically unsaturated monomer that is used to polymerize the second polymer particles are added to the first polymer dispersion. Next, the added ethylenically unsaturated monomer is polymerized to provide the second mode of second polymer particles while any remaining ethylenically unsaturated monomer that is used to prepare the second polymer particles is added. The process of this embodiment may be practiced as a continuous or semi-continuous process wherein a reaction mixture is prepared containing the first polymer particles, the hydrophobic polymerization blocker, and at least 25 weight % of the ethylenically unsaturated monomer; a portion of the reaction mixture is continuous removed from the remaining reaction mixture; and then polymerized to prepare the second polymer particles.

The level of unreacted monomer remaining in the aqueous polymer dispersion after the formation of the second polymer particles may be reduced by various methods known in the art, including one or more monomer chasing steps in which initiator is added to react away monomer; and stripping processes that remove the unreacted monomer such as steam stripping.

Chain transfer agents such as mercaptans, polymercaptan, and polyhalogen compounds in the polymerization mixture may be used to moderate the molecular weight. Examples of chain transfer agents which may be used include long chain alkyl mercaptans such as t-dodecyl mercaptans, alcohols such as isopropanol, isobutanol, lauryl alcohol, or t-octyl alcohol, carbon tetrachloride, tetrachloroethylene, and trichlorobromoethane. Generally from 0.1 to 3 weight % chain transfer agent, based on the weight of total monomer, may be used. Alternatively, suitable molecular weights may be obtained by increasing the initiator level, or by a combination of increased initiator level and a chain transfer agent.

Ethylenically unsaturated monomers suitable for use in the process of the present invention, or for preparing the first polymer particles, include monomers such as styrene, butadiene, vinyl toluene, vinyl naphthalene, ethylene, propylene, vinyl acetate, vinyl versatate, vinyl chloride, vinylidene chloride, acrylonitrile, methacrylonitrile, (meth)acrylamide, various $C_1$-$C_{40}$ alkyl esters of (meth)acrylic acid; for example, methyl (meth)acrylate, ethyl (meth)acrylate, n-butyl (meth)acrylate, 2-ethylhexyl (meth)acrylate, cyclohexyl (meth)acrylate, n-octyl (meth)acrylate, n-decyl (meth)acrylate, n-dodecyl (meth)acrylate, tetradecyl (meth)acrylate, lauryl (meth)acrylate, oleyl (meth)acrylate, palmityl (meth)acrylate, and stearyl (meth)acrylate; other (meth)acrylates such as isobornyl (meth)acrylate, benzyl (meth)acrylate, phenyl (meth)acrylate, and 2-bromoethyl (meth)acrylate, alkoxyalkyl (meth)acrylate, such as ethoxyethyl (meth)acrylate, full esters of ethylenically unsaturated di- and tricarboxylic acids and anhydrides, such as ethyl maleate, dimethyl fumarate, and ethyl methyl itaconate. Other suitable monomers are anionic monomers, which includes carboxylic acid containing monomers, such as (meth)acrylic acid, itaconic acid, fumaric acid, and maleic acid; phosphorus acid containing monomers are dihydrogen phosphate monomers, which include 2-phosphoethyl (meth)acrylate, 2-phosphopropyl (meth)acrylate, 3-phosphopropyl (meth)acrylate, and 3-phospho-2-hydroxypropyl (meth)acrylate; sulfur acid containing monomers such as vinyl sulfonic acid and styrene sulphonic acid. Ionic monomers also include salts of the anionic monomers, such as ammonium, sodium, or potassium salts. Still other suitable monomers include multiethylenically unsaturated monomers, which are effective for raising the molecular weight and crosslinking the polymer particles. Examples of multiethylenically unsaturated monomers include allyl (meth)acrylate, tripropylene glycol di(meth)acrylate, diethylene glycol di(meth)acrylate, ethylene glycol di(meth)acrylate, 1,6-hexanediol di(meth)acrylate, 1,3-butylene glycol di(meth)acrylate, polyalkylene glycol di(meth)acrylate, diallyl phthalate, trimethylolpropane tri(meth)acrylate, divinylbenzene, divinyltoluene, trivinylbenzene, and divinyl naphthalene.

In certain embodiment, the first polymer particles or the second polymer particles contain as polymerized units, one or more aldehyde reactive group-containing monomers. By "aldehyde reactive group-containing monomer" is meant herein a monomer which, in a homogeneous solution containing 20% by weight of the monomer and an equimolar amount of formaldehyde at any pH from 1 to 14, will exhibit greater than 10% extent of reaction between the monomer and formaldehyde on a molar basis in one day at 25° C. Included as ethylenically unsaturated aldehyde reactive group-containing monomers are, for example, vinyl acetoacetate, acetoacetoxyethyl (meth)acrylate, acetoacetoxypropyl (meth)acrylate, allyl acetoacetate, acetoacetoxybutyl (meth)acrylate, 2,3-di(acetoacetoxy)propyl (meth)acrylate, vinyl acetoacetamide, acetoacetoxyethyl (meth)acrylamide, 3-(2-vinyloxyethylamino)-propionamide, N-(2-(meth)acryloxyethyl)-morpholinone-2,2-methyl-1-vinyl-2-imidazoline, 2-phenyl-1-vinyl-2-imidazoline, 2-(3-oxazolidinyl)ethyl (meth)acrylate, N-(2-vinoxyethyl)-2-methyloxazolidine, 4,4-dimethyl-2-isopropenyloxazoline, 3-(4-pyridyl)propyl (meth)acrylate, 2-methyl-5-vinyl-pyridine, 2-vinoxyethylamine, 2-vinoxyethylethylene-diamine, 3-aminopropyl vinyl ether, 2-amino-2-methylpropyl vinyl ether, 2-aminobutyl vinyl ether, tert-butylaminoethyl (meth)acrylate, 2-(meth)acryloxyethyldimethyl-α-propiobetaine, diethanolamine monovinyl ether, (meth)acryloxyacetamido-ethylethyleneurea, ethyleneureidoethyl (meth)acrylate, (meth)acrylamidoethyl-ethyleneurea, (meth)acrylamidoethyl-ethylenethiourea, N-((meth)acrylamidoethyl)-N-(1-hydroxymethyl)ethyleneurea, o-aniline vinyl thioether, N-((meth)acrylamidoethyl)-N-(1-methoxy)methylethyleneurea, N-formamidoethyl-N-(1-vinyl)ethyleneurea, N-vinyl-N-(1-aminoethyl)-ethyleneurea, N-(ethyleneureidoethyl)-4-pentenamide, N-(ethylenethioureido-ethyl)-10-undecenamide, butyl ethyleneureido-ethyl fumarate, methyl ethyleneureidoethyl fumarate, benzyl N-(ethyleneureido-ethyl) fumarate, benzyl N-(ethyleneureido-ethyl) maleamate, N-vinoxyethylethylene-urea, N-(ethyleneureidoethyl)-crotonamide, ureidopentyl vinyl ether, 2-ureidoethyl (meth)acrylate, N-2-(allylcarbamoto)aminoethyl imidazolidinone, 1-(2-((2-hydroxy-3-(2-propenyloxy)propyl)amino)ethyl)-2-imidazolidinone, hydrogen ethyleneureidoethyl itaconamide, ethyleneureidoethyl hydrogen itaconate, bis-ethyleneureidoethyl itaconate, ethyleneureidoethyl undecylenate, ethyleneureidoethyl undecylenamide, 2-(3-methylolimidazolidone-2-yl-1)ethyl acrylate, N-acryloxyalkyl oxazolidines, acylamidoalkyl vinyl alkyleneureas, aldehyde-reactive amino group-containing monomers as dimethylaminoethyl methacrylate, and ethylenically unsaturated monomers containing aziridine functionality. The incorporation of aldehyde reactive group-containing monomers into the one or more modes of polymer particles may be used to improve the adhesion to a substrate of a coating that is formed from the aqueous polymer dispersion.

The process of this invention may optionally contain subsequent polymerization steps. For example, after the formation of the second mode of second polymer particles, hydrophobic polymerization blocker is added to the aqueous polymer dispersion containing the first and second modes, and then additional ethylenically unsaturated monomer may be polymerized in the presence of the first polymer particles and the second polymer particles to form a third mode of third polymer particles. The third mode may be disparate from the first mode and the second mode. In another example, after the formation of the second mode, the additional ethylenically unsaturated monomer is polymerized onto or into one or both of the first mode or second mode of polymer particles.

The aqueous polymer dispersion prepared by the process of the first aspect of the invention contains at least two disparate modes of polymer particles, including a first mode containing first polymer particles and a second mode containing second polymer particles.

The aqueous polymer dispersion containing disparate modes of polymer particles, in which each mode has a different average particle diameter, is characterized as having a particle size distribution having two or more peaks. The particle size distribution is the number of polymer particles having a certain particle diameter as a function of the particle diameter. Each peak is associated with a mode of polymer particles. The particle size distribution is measured using a capillary hydrodynamic fractionation apparatus, such as the Matec CHDF-2000 apparatus (Matec Applied Sciences, MA) with ultraviolet detection at 200 nm. Particle size standards are provided by National Institute of Standards and Technology (NIST) traceable polystyrene standards of 50 to 800 nm, such as supplied by Duke Scientific Corporation, CA. In one embodiment, the difference in the average particle diameters of each mode of polymer particles is at least 50 nm, preferably at least 80 nm, more preferably at least 100 nm, and most preferably at least 150 nm. Either the mode having the smaller particle diameters or the mode having the large particle diameters may be prepared in the presence of the other mode.

The aqueous polymer dispersion containing disparate modes of polymer particles, in which each mode has a different weight average molecular weight, is characterized as having weight average molecular weight distribution having two or more peaks. The weight average molecular weight distribution is the weight of polymer particles having a certain molecular weight as a function of the molecular weight. Weight average molecular weight may be measured using gel permeation chromatography with a polystyrene standard. In one embodiment, the difference in the weight average molecular weight of each mode of polymer particles is at least 25,000 Daltons, preferably at least 50,000 Daltons, more preferably at least 100,000 Daltons, and most preferably at least 250,000 Daltons. The mode having either the higher weight average molecular weight or the lower molecular weight may be prepared in the presence of the other respective mode.

The aqueous polymer dispersion may be provided with disparate modes of polymer particles, in which each mode has a different glass transition temperature. The glass transition temperature of each mode is calculated using the Fox equation as described hereinabove. In one embodiment, the difference in the glass transition temperatures of each mode of polymer particles is at least 10° C., preferably at least 20° C., more preferably at least 30° C., and most preferably at least 40° C. The mode having the higher or the lower glass transition temperature may be prepared in the presence of the other mode.

The aqueous polymer dispersion may be provided with disparate modes of polymer particles, in which the morphology of the polymer particles in each mode is different. For example, the first mode may contain first polymer particles having a core-shell morphology while second mode may contain second polymer particles having a single polymer phase. Particle morphology may be determined by visible or electron microscopy. Staining of one polymer phase in a multiphase polymer particle may be employed.

The aqueous polymer dispersion may be provided with disparate modes of polymer particles, in which the mode having the smaller particle diameter also contains polymerized monomer having certain functional groups located near or at the surface of the polymer particle. Preparing the aqueous polymer dispersion with these certain monomers only in the smaller particle mode allows the use of lower levels of these certain monomers. In particular, the reacted certain monomers are concentrated on or into surface of the smaller polymer particles, which have a larger surface area relative to their volume compared polymer particles of the larger mode. The placement of the reacted certain monomer on or into the surfaces of the smaller polymer particles is useful for enhancing one or more desired properties of the aqueous polymer dispersion, or articles prepared from the aqueous polymer dispersion. Examples of certain monomers include carboxylic acid containing monomers or phosphorus acid containing monomers, which may be crosslinked by a divalent metal ion such as zinc ion; fluorinated monomers, silicon containing monomers, and adhesion promoting monomers.

In one embodiment, the aqueous polymer dispersion of this invention is prepared as a high solids composition containing from 40 to 75 weight % polymer solids, preferably 50 to 75 weight % polymer solids, based on the weight of the aqueous polymer dispersion. The polymer solids is the total weight of polymer particles contained in the aqueous polymer dispersion, based on dry weight of polymer particles. In this embodiment, the aqueous polymer dispersion contains one mode having an average particle diameter in the range of from 150 to 2.5 microns, preferably from 150 to 2 microns, and more preferably from 150 to 1.5 microns; and another mode having an average particle diameter in the range of from 20 to 400 nm, preferably from 30 to 300 nm, and more preferably from 35 to 200 nm, wherein the average particle diameter of the large mode is at least 75% greater than the average particle diameter of the small mode.

In the second aspect of the present invention, a process is provided for preparing an aqueous polymer dispersion containing at least two disparate modes of polymer particles, including: providing a first polymer dispersion containing a first mode of first polymer particles dispersed in an aqueous medium; adding a styrenic monomer polymerization blocker selected from styrene or ring-substituted styrene having a water solubility of less than 0.05 g/100 milliliters of water to the first polymer dispersion; adding ethylenically unsaturated monomer to the first polymer dispersion, wherein the ethylenically unsaturated monomer contains from 0 to 20 weight % styrene of ring-substituted styrene, based on weight of the ethylenically unsaturated monomer; and polymerizing the ethylenically unsaturated monomer in the presence of the first polymer particles to provide a second mode of second polymer particles; wherein the first mode and the second mode are the at least two disparate modes. The styrenic monomer polymerization blocker is a styrenic material that minimizes the rate of polymerization or prevents polymerization of the ethylenically unsaturated monomer. The ring-substututed styrene has at least one substituent group attached to the aromatic ring of the styrene. The substituent group is in the ortho, meta, or para position of the aromatic ring. Further, the ring-substituted styrene has a water solubility of less than 0.05 g/100 milliliters of water, preferably less than 0.02 g/100 milliliters of water, and more preferably, at less than 0.01 g/100 milliliters of water. The amount of styrenic monomer polymerization blocker is typically in the range of from 5 to 50 weight %, preferably 10 to 50 weight %, and more preferably, from 15 to 50 weight %, based on the weight of the first polymer particles. Examples of suitable ring-substituted styrenes include alkyl group ring-substituted styrenes such as o-methyl styrene, p-methyl styene, p-tertiary butyl styrene, p-bromostyrene, p-chlorostyrene, and p-methoxystyrene.

After the addition of the styrenic monomer polymerization blocker, one or more ethylenically unsaturated monomer is added to the first polymer dispersion and polymerized to prepare the second polymer particles. The ethylenically unsaturated monomer contains from 0 to 20 weight %, preferably 0 to 15 weight %, and more preferably 0 to 10 weight % styrene or ring-substituted styrene, based on the weight of the ethylenically unsaturated monomer. In one embodiment of the second aspect of the invention, the styrenic monomer polymerization blocker is added rapidly to the first polymer dispersion, followed by the addition of some or all of the ethylenically unsaturated monomer, and the initiation of the polymerization of the added ethylenically unsaturated monomer. Preferably, the polymerization is initiated immediately or nearly immediately after the addition of some or all of the ethylenically unsaturated monomer. In a different embodiment, some or all of the ethylenically unsaturated monomer is added as a miniemulsion.

In the third aspect of the present invention, a process is provided for preparing an aqueous polymer dispersion containing polymer particles having a particle size distribution with a broad polydispersity. Such aqueous polymer dispersions are useful in a wide variety of applications and may be provided at high polymer solids while maintaining a suitable low viscosity for handling or application. The process of the third aspect includes: adding a first ethylenically unsaturated monomer to an aqueous medium; polymerizing the first ethylenically unsaturated monomer in the aqueous medium to prepare first polymer particles; adding concurrently a hydrophobic polymerization blocker and second ethylenically unsaturated monomer to the aqueous medium; and polymerizing the second ethylenically unsaturated monomer in the aqueous medium to prepare second polymer particles. The first ethylenically unsaturated monomer refers to the one or more ethylenically unsaturated monomers used to form the first polymer particles. The second ethylenically unsaturated monomer refers to the one or more ethylenically unsaturated monomers used to form the second polymer particles. The aqueous polymer dispersion prepared by the process of the third aspect of the invention has a particle size distribution characterized by a polydispersity of at least 1.5, preferably at least 2, and more preferably at least 2.5. The particle size distribution refers to the diameters of the first polymer particles and the second polymer particles. The polydispersity of the particle size distribution is characterized by the formula:

$$\text{polydispersity} = (D_{90} - D_{10}) / D_{50}$$

wherein $D_{10}$, $D_{50}$, and $D_{90}$ are respectively the particle diameters at which the integral of the distribution function $dG = f(D)dD$, where G is the polymer mass and D is the particle diameter, is equal to 0.1 (=10% by weight), 0.5 (=50% by weight), and 0.9 (=90% by weight) of the total mass of the polymer particles contained in the aqueous polymer dispersion. Preferably, in this aspect, the hydrophobic polymerization blocker is not styrene.

In the process of the third aspect of this invention, the hydrophobic polymerization blocker and the second ethylenically unsaturated monomer are added concurrently for some duration of the addition of the second ethylenically unsaturated monomer. For example, the hydrophobic polymerization blocker is added concurrently for at least 25 weight %, preferably, at least 50 weight %, and more preferably at least 75 weight % of the addition of the second ethylenically unsaturated monomer. The hydrophobic polymerization blocker, the ethylenically unsaturated monomer, or both may be added continuously, in steps, or with variable addition rates. Optionally, seed polymers, surfactant, or pH adjusting agents may be added to aid in the formation of the second polymer particles. Alternatively, the second ethylenically unsaturated monomer may be added to the aqueous medium as a miniemulsion.

In one embodiment of the process of the third aspect of this invention, the same monomer or monomers are used to form the first polymer particles and second polymer particles. In this embodiment, the aqueous polymer dispersion contains first polymer particles and second polymer particles having the same polymer composition, wherein the aqueous composition has a particle size distribution having a broad polydispersity.

A volatile organic compound ("VOC") is defined herein as a carbon containing compound that has a boiling point below 280° C. at atmospheric pressure. Compounds such as water and ammonia are excluded from VOCs.

The aqueous polymer dispersion of this invention may be provided as a low VOC composition containing less than 5% VOC by weight, preferably less than 3% VOC by weight, and more preferably, less than 1.7% VOC by weight, based on the total weight of the aqueous polymer dispersion. For example, the aqueous polymer dispersion may be provided with between 0.01% and 1.7% VOC by weight based on the total weight of the aqueous polymer dispersion.

In addition, the aqueous polymer dispersion optionally includes other components, including other polymers, surfactants, pigments, extenders, dyes, pearlescents, adhesion promoters, crosslinkers, dispersants, defoamers, leveling agents, optical brighteners, ultraviolet stabilizers, absorbing pigments, coalescents, rheology modifiers, preservatives, biocides, polymer particles having internal voids, and antioxidants.

The aqueous polymer dispersion of the present invention is useful for preparing protective or aesthetic coatings, such as wood coating, maintenance coating, interior or exterior wall coating, metal primer or coating, traffic paint, woven or nonwoven coating, leather coating, coil coating, architectural coating, mastic sealant, board coating, paper coating, elastomeric wall or roof coatings, ink, overcoat varnish, and flooring coating. Coatings prepared from the aqueous polymer dispersion may be clear coatings, flat coatings, satin coatings, semi-gloss coatings, gloss coatings, primers, textured coatings, and the like. Other uses for the aqueous polymer dispersion includes textile saturants, caulks, and adhesives. The aqueous polymer dispersion is also useful as impact, performance, or processes modifiers for thermoplastics such as polyvinyl chloride.

Coatings may be prepared by applying the aqueous polymer dispersion to a substrate by conventional methods such as, for example, brushing, rolling, drawdown, dipping, with a knife or trowel, curtain coating, and spraying methods such as, for example, air-atomized spray, air-assisted spray, airless spray, high volume low pressure spray, and air-assisted airless spray. The wet coating thickness of the aqueous polymer dispersion is typically in the range of from 1 micron to 2 millimeters. The aqueous polymer dispersion is applied onto a substrate as a single coat or multiple coats. The applied aqueous polymer dispersion is allowed to dry at ambient conditions, such as, for example, at from 0° C. to 35° C., and in the alternative, dried at elevated temperatures such as, for example, from 35° C. to 150° C. Suitable substrates include, but are not limited to, medium density fiber board; chip boards, and laminates; mineral substrates such as masonry, cement, fiber cement, cement asbestos, plaster, plaster board, glazed and unglazed ceramic; metal substrates such as galvanized iron, galvanized steel, cold rolled steel, aluminum, wrought iron, drop forged steel, and stainless steel; previously painted or primed surfaces; cellulosic substrates such as paper and paperboard; glass; asphalt; leather; wallboard; non-woven materials; and synthetic substrates such as polyvinyl chloride, polyvinylidene chloride, polyethylene, and polypropylene.

The following examples are presented to illustrate the process and the composition of the invention. These examples are intended to aid those skilled in the art in understanding the present invention. The present invention is, however, in no way limited thereby.

The Following Abbreviation are Used in the Examples:

| | |
|---|---|
| APS | ammonium persulfate |
| BA | butyl acrylate |
| MAA | methacrylic acid |
| MMA | methyl methacrylate |
| Surfactant-A | ammonium alkyl ethyleneoxide sulfate (30% active) |
| wt. % | weight % |

EXAMPLE 1

Preparation of Aqueous Polymer Dispersion Containing Disparate Polymer Particles by Process of Invention All reactions were conducted in a 5-liter, 4-necked round bottom flask equipped with a paddle stirrer, a thermometer, a nitrogen inlet, and a reflux condenser, unless noted otherwise.

The level of solids was determined by gravimetric analysis.

The percent fines is defined as the weight % of the polymer particle mode having an average particle diameter of less than 100 nm. The percent fines was determined by separating the large particle diameter mode from the smaller particle diameter mode by centrifugation. The aqueous polymer dispersion was diluted to 25 wt. % solids and centrifuged at 12,000 rpm for 45 minutes. The serum phase, which contained the smaller particle diameter mode, was decanted from the precipitated polymer, which contained the large particle diameter mode. The mass of the serum phase and the amount of polymer in the serum were determined by gravimetric analysis, and the % fines were reported as weight %, based on the difference between total weight of polymer charged to the centrifuge tube minus the weight of polymer removed in the serum.

EXAMPLE 1.1

To the flask was added 850.0 g deionized water. The contents of the flask was heated to 85° C. under a nitrogen atmosphere. The following materials were added to the flask: 40.0 g of pre-polymer seed latex (45 wt. % solids), and a solution of 2.6 g APS in 20.0 g deionized water. Next, a monomer emulsion, which contained 600.0 g deionized water, 28.5 g of Surfactant-A, 851.7 g BA, 817.7 g MAA, and 34.0 g MAA, was added to the flask over a period of 3 hours. A catalyst solution containing 2.6 g APS in 75.0 g deionized water was added to the flask during the last 90 minutes of the monomer emulsion addition. After 60 wt. % of the monomer emulsion was added, the addition of the monomer emulsion and the catalyst solution were stopped and the contents of the flask was maintained at a temperature of 85° C. for 15 minutes. Next, a mixture of 90.5 g of Surfactant-A in 115.0 g deionized water was charged to the flask in one portion, followed by the addition of 136.3 g of α-methylstyrene. The contents of the flask was maintained at temperature for 5 minutes, and then the additions of the monomer emulsion and the catalyst solution were resumed. After the complete addition of the monomer emulsion and the catalyst solution, the contents of the flask was maintained at a temperature of 85° C. for 15 minutes, and then cooled to room temperature. Next, sufficient ammonium hydroxide solution was added to the flask to the raise the pH to 9. The contents of the flask was filtered to remove any coagulum.

EXAMPLE 1.2

To the flask was added 680.0 g deionized water. The contents of the flask was heated to a temperature of 85° C. under a nitrogen atmosphere. The following materials were added to the flask: 40.0 g of pre-polymer seed latex (45% solids), and a solution of 2.6 g APS in 20.0 g deionized water. Next, a monomer emulsion, which contained 600.0 g deionized water, 28.5 g Surfactant-A, 851.7 g BA, 817.7 g MMA, and 34.0 g MAA, was added to the flask over a period of 3 hours. A catalyst solution containing 2.6 g APS in 75.0 g deionized water was added to the flask during the last 90 minutes of the monomer emulsion addition. After 60 wt. % of the monomer emulsion was added, the additions of the monomer emulsion and the catalyst solution were stopped and the contents of the flask was maintained at a temperature of 85° C. for 15 minutes. Next, a mixture of 90.5 g of Surfactant-A in 115.5 g deionized water was added to the flask in one portion, followed by the addition of 17.0 g of n-dodecylmercaptan. The contents of the flask was maintained at temperature for 5 minutes, and then the additions of the monomer emulsion and the catalyst solution were resumed. After the complete addition of the monomer emulsion and the catalyst solution, the contents of the flask was maintained at temperature of 85° C. for 15 minutes, and the cooled to room temperature. Next, sufficient ammonium hydroxide solution was added to raise the pH to 9. The contents of the flask was filtered to remove any coagulum.

Comparative A

To the flask was added 700.0 g deionized water. The contents of the flask was heated to 85° C. under a nitrogen atmosphere. The following materials were added to the flask: 40.0 g of pre-polymer seed latex (45 wt. % solids), and a solution of 2.6 g APS in 20.0 g deionized water. Next, a monomer emulsion, which contained 600.0 g deionized water, 28.5 g of Surfactant-A, 851.7 g BA, 817.7 g MMA, and 34.0 g MAA, was added to the flask over a period of 3 hours. A catalyst solution of 2.6 g APS in 75.0 g deionized water was added to the flask over the last 90 minutes of monomer emulsion addition. After 60 wt. % of the monomer emulsion was added, the addition of the monomer emulsion and the catalyst solution were stopped and the contents of the flask was maintained at a temperature of 85° C. for 15 minutes. Next, a mixture of 90.5 g of Surfactant-A in 115.0 g deionized water was charged to the flask in one portion, and the contents of the flask was maintained at temperature for 5 minutes. Then, the additions of the monomer emulsion and the catalyst solution were resumed. After the complete addition of the monomer emulsion and the catalyst solution, the contents of the flask was maintained at a temperature of 85° C. for 15 minutes, and then cooled to room temperature. Next, sufficient ammonium hydroxide solution (28% active) was added to the flask to raise the pH to 9. The contents of the flask was filtered to remove any coagulum.

TABLE 1.1

Properties of Aqueous Polymer Dispersions of Example 1.1-1.2 and Comparative A

|  | Example 1.1 | Example 1.2 | Comparative A |
| --- | --- | --- | --- |
| wt. % fines | 30 wt. % | 10 wt. % | 4 wt. % |
| particle diameter of mode 1 | 360 nm | 401 nm | 420 |
| particle diameter of mode 2 | 59 nm | 56 nm | — |

The results in Table 1.1 show that the preparation of the aqueous polymer dispersions of Examples 1.1 and 1.2 according to the process of the first aspect of this invention, which included polymerization in the presence of a hydrophobic polymerization blocker, provided aqueous polymer dispersions have two disparate modes of polymer particles. In these examples, the disparate modes are characterized by different average particle diameters. In contrast, the comparative example, Comparative A, had a clear serum phase having a trace amount of material remaining in the serum phase, which was indicative of surfactant.

EXAMPLE 1.3

To the flask was added 700.0 g deionized water. The contents of the flask was heated to 85° C. under a nitrogen atmosphere. The following materials were added to the flask: 40.0 g of pre-polymer seed latex (45 wt. % solids) and a solution of 2.6 g APS in 20.0 g deionized water. Next, a first monomer emulsion (ME-1), which contained 360.0 g deionized water, 17.1 g Surfactant-A, 235.1 g BA, 766.5 g MMA, and 20.4 g MAA, was added to the flask over a period of 2 hours. A catalyst solution of 2.6 g APS in 75.0 g deionized water was added to the flask during the last 30 minutes of the addition of ME-1. After the complete addition of ME-1, the catalyst feed was stopped and the contents of the flask was maintained at a temperature of 85° C. for 15 minutes. Next, a mixture of 90.5 g of Surfactant-A in 115.0 g deionized water was added to the flask in one portion, followed by the addition of 136.3 g of α-methylstyrene. The contents of the flask was maintained at temperature for 5 minutes. Then, a second monomer emulsion (ME-2), which contained 240.0 g deionized water, 11.4 g of Surfactant-A, 340.7 g BA, 327.1 g MMA, and 13.6 g MAA, was added over a period of 60 minutes. The addition of the catalyst solution addition was resumed and was added simultaneous with the addition of ME-2. After the complete addition of ME-2 and the catalyst solution, the contents of the flask was maintained at a temperature of 85° C. for 15 minutes, and then cooled to room temperature. Sufficient ammonium hydroxide solution was added to the flask to raise the pH to 9. The contents of the flask was filtered to remove any coagulum.

Comparative B

The comparative aqueous polymer dispersion of Comparative B was prepared according to the general procedure of Example 1.3, except that α-methylstyrene was not added.

TABLE 1.2

Properties of Aqueous Polymer Dispersions of Example 1.3 and Comparative B

|  | Example 1.3 | Comparative B |
| --- | --- | --- |
| wt. % fines | 24 wt. % | 2 wt. % |
| Particle diameter of mode 1 | 374 nm | 410 nm |
| Particle diameter of mode 2 | 48 nm | — |

The results in Table 1.2 show that the preparation of the aqueous polymer dispersions of Examples 1.3 according to the process of the first aspect of this invention, which included polymerization in the presence of a hydrophobic polymerization blocker, provided an aqueous polymer dispersion have two disparate modes of polymer particles. In these examples, the disparate modes are characterized by different average particle diameters, different polymer composition, and different glass transition temperatures. In contrast, the comparative example, Comparative B, had a clear serum phase containing a trace amount of material, which was indicative of surfactant.

EXAMPLE 1.4

To the flask was added 850.0 g deionized water. The contents of the flask was heated to 85° C. under a nitrogen atmosphere. The following materials were added to the flask: 40.0 g of pre-polymer seed latex (45 wt. % solids) and a solution containing 2.6 g APS in 20.0 g deionized water. A first monomer emulsion (ME-1), which contained 360.0 g deionized water, 17.1 g Surfactant-A, 766.5 g BA, 235.1 g MMA, and 20.4 g MAA, was added to the flask over a period of 2 hours. A catalyst solution containing 2.6 g APS in 75.0 g deionized water was added to the flask over the last 90 minutes of the monomer emulsion addition. After the complete addition of ME-1, the addition of the catalyst solution was stopped and the contents of the flask was maintained at a temperature of 85° C. for 15 minutes. Next, a mixture of 90.5 g of Surfactant-A in 115.0 g deionized water was added to the flask in one portion, followed by the addition of 136.3 g of α-methylstyrene. The contents of the flask was maintained at temperature for 5 minutes. Then, a second monomer emulsion (ME-2), which contained 240.0 g deionized water, 11.4 g of Surfactant-A, 156.7 g BA, 511.0 g MMA, and 13.6 g MAA, was added over a period of 60 minutes. The addition of the catalyst solution was resumed and was simultaneous with the addition of ME-2. After the complete addition of ME-2 and the catalyst solution, the contents of the flask was maintained at a temperature of 85° C. for 15 minutes, and then cooled to room temperature. Sufficient ammonium hydroxide solution was added to the flask to raise the pH to 9. The contents of the flask was filtered to remove any coagulum.

EXAMPLE 1.5

To the flask was added 700.0 g deionized water. The contents of the flask was heated to 85° C. under a nitrogen atmosphere. The following materials were added to the flask: 40.0 g of pre-polymer seed latex, 45% solids, and a solution containing 2.6 g APS in 20.0 g deionized water. A first monomer emulsion (ME-1), which contained 360.0 g deionized water, 17.1 g Surfactant-A, 766.5 g BA, 235.1 g MMA, and 20.4 g MAA, was added to the flask over a period of 2 hours. A catalyst solution containing 2.6 g APS in 75.0 g deionized water was added to the flask over the last 90 minutes of the addition of ME-1. After the complete addition of ME-1, the catalyst feed was stopped and the contents of the flask was maintained at a temperature of 85° C. for 15 minutes. A mixture containing 0.87 g of 2,2,6,6-tetramethyl-1-piperidinyloxy (TEMPO), 90.5 g of Surfactant-A and 115.0 g deionized water was added to the flask in one portion, and the contents of the flask was maintained at temperature for 5 minutes. Next, a second monomer emulsion (ME-2), which contained 240.0 g deionized water, 11.4 g of Surfactant-A, 156.7 g BA, 511.0 g MMA, and 13.6 g MAA, was added over a period of 60 minutes. The addition of the catalyst solution was resumed and was simultaneous with the addition of ME-2. After the complete addition of ME-2 and the catalyst solution, the contents of the flask was maintained at a temperature of 85° C. for 15 minutes, and then cooled to room temperature. Sufficient ammonium hydroxide solution was added to the flask to raise the pH to 9. The contents of the flask was filtered to remove any coagulum.

EXAMPLE 1.6

To the flask was added 720.0 g deionized water. The contents of the flask was heated to 85° C. under a nitrogen atmosphere. The following materials were added to the flask: 40.0 g of pre-polymer seed latex (45 wt. % solids) and a solution containing 2.6 g APS in 20.0 g deionized water. A first monomer emulsion (ME-1), which contained 360.0 g deionized water, 17.1 g Surfactant-A, 766.5 g BA, 235.1 g MMA, and 20.4 g MAA, was added to the flask over a period of 2 hours. Next, a catalyst solution containing 2.6 g APS in 75.0 g deionized water was added to the flask over the last 90 minutes of the addition of ME-1. After the complete addition of ME-1, the addition of the catalyst solution was stopped and the contents of the flask was maintained at a temperature of 85° C. for 15 minutes. Then, a mixture of 90.5 g of Surfactant-A in 115.0 g deionized water was added to the flask in one portion, followed by the addition of 34.1 g of n-dodecylmercaptan. The contents of the flask was maintained at temperature for 5 minutes. Next, a second monomer emulsion (ME-2), which contained 240.0 g deionized water, 11.4 g of Surfactant-A, 156.7 g BA, 511.0 g MMA, and 13.6 g MAA, was added over the next 60 minutes. The addition of the catalyst solution was resumed and was simultaneous with the addition ME-2. After the complete addition of ME-2 and the catalyst solution, the contents of the flask was maintained at a temperature of 85° C. for 15 minutes, and then cooled to room temperature. Sufficient ammonium hydroxide solution was added to the flask to raise the pH to 9. The contents of the flask was filtered to remove any coagulum.

EXAMPLE 1.7

The reaction was conducted in a 3-liter, 4-necked round bottom flask equipped with a paddle stirrer, a thermometer, a nitrogen inlet, and a reflux condenser. To the flask was added 350 g deionized water. The contents of the flask was heated to 85° C. under a nitrogen atmosphere. The following materials were added to the flask: 20.0 g of pre-polymer seed latex (45 wt. % solids) and a solution of 1.3 g APS in 10.0 g deionized water. A first monomer emulsion (ME-1), which contained 180.0 g deionized water, 8.55 g Surfactant-A, 383.2 g BA, 117.5 g MMA, and 10.2 g MAA, was added to the flask over a period of 2 hours. Next, a catalyst solution of 1.3 g APS in 37.5 g deionized water was added to the flask over the last 90 minutes of the addition of ME-1. After the complete addition of ME-1, the catalyst feed was stopped and the contents of the flask was maintained at a temperature of 85° C. for 15 minutes. Next, a mixture of 0.85 g of 1,1-diphenylethene, 45.3 g of Surfactant-A, and 57.5 g deionized water was charged to the flask in one portion, and the contents of the flask was maintained at temperature for 5 minutes. Then, a second monomer emulsion (ME-2), which contained 120.0 g deionized water, 5.70 g of Surfactant-A, 78.35 g BA, 255.5 g MMA, and 6.8 g MAA, was added over a period of 60 minutes. The addition of the catalyst solution was resumed and was simultaneous with the addition of ME-2. After the complete addition of ME-2 and the catalyst solution, the contents of the flask was maintained at a temperature of 85° C. for 15 minutes, and then cooled to room temperature. Sufficient ammonium hydroxide solution was added to the flask to raise the pH to 9. The contents of the flask was filtered to remove any coagulum.

Comparative C

To the flask was added 700.0 g deionized water. The contents of the flask was heated to 85° C. under a nitrogen atmosphere. The following materials were added to the flask: 40.0 g of pre-polymer seed latex (45 wt. % solids) and a solution of 2.6 g APS in 20.0 g deionized water. A first monomer emulsion (ME-1), which contained 360.0 g deionized water, 17.1 g Surfactant-A, 766.5 g BA, 235.1 g MMA, and 20.4 g MAA, was added to the flask over a period of 2 hours. A catalyst solution containing 2.6 g APS in 75.0 g deionized water was added to the flask over the last 90 minutes of the addition of ME-1. After the complete addition of ME-1, the addition of the catalyst solution was stopped and the contents of the flask was maintained at a temperature of 85° C. for 15 minutes. Next, a mixture of 90.5 g of Surfactant-A in 115.0 g deionized water was added to the flask in one portion, and the contents of the flask was maintained at temperature for 5 minutes. Then, a second monomer emulsion, which contained 240.0 g deionized water, 11.4 g of Surfactant-A, 156.7 g BA, 511.0 g MMA, and 13.6 g MAA, was added over a period of 60 minutes. The addition of the catalyst solution was resumed and added simultaneous with the addition of ME-2. After the complete addition of ME-2 and the catalyst solution, the contents of the flask was maintained at a temperature of 85° C. for 15 minutes, and then cooled to room temperature. Sufficient ammonium hydroxide solution was added to the flask to raise the pH to 9. The contents of the flask was filtered to remove any coagulum.

TABLE 1.3

Properties of Aqueous Polymer Dispersions of Examples 1.4-1.7 and Comparative C

|  | Example 1.4 | Example 1.5 | Example 1.6 | Example 1.7 | Comparative C |
|---|---|---|---|---|---|
| wt. % fines | 33 wt. % | 17 wt. % | 26 wt. % | 29 wt. % | 6 wt. % |
| particle | 365 nm | 378 nm | 364 nm | 359 nm | 386 nm |

TABLE 1.3-continued

Properties of Aqueous Polymer Dispersions of Examples 1.4-1.7 and Comparative C

| | Example 1.4 | Example 1.5 | Example 1.6 | Example 1.7 | Comparative C |
|---|---|---|---|---|---|
| diameter of mode 1 particle diameter of mode 2 | 65 nm | 54 nm | 52 | 56 | — |

The results in Table 1.3 show that the preparation of the aqueous polymer dispersions of Examples 1.4 to 1.7 according to the process of the first aspect of this invention, which included polymerization in the presence of a hydrophobic polymerization blocker, provided aqueous polymer dispersions have two disparate modes of polymer particles. In these examples, the disparate modes are characterized by one or more of the following: different average particle diameters, different polymer composition, or different glass transitions. In contrast, the comparative example, Comparative C, which included the polymerization of the second monomer emulsion in the presence of the first polymer particles in the absence of a hydrophobic polymerization blocker, had a clear serum phase containing a trace amount of material, which was indicative of surfactant.

What is claimed is:

1. A process for preparing an aqueous polymer dispersion comprising at least two disparate modes of polymer particles, comprising:
    providing a first polymer dispersion containing a first mode of first polymer particles dispersed in an aqueous medium;
    adding a hydrophobic polymerization blocker having a water solubility of less than 1 g/100 milliliter water at a temperature of 25° C. to said first polymer dispersion; and
    mixing the polymerization blocker and the first polymer dispersion for at least one minute; followed by
    adding and polymerizing ethylenically unsaturated monomer in the presence of said first polymer particles to provide a second mode of second polymer particles;
    wherein the polymerization blocker is allowed at least one minute after adding to partition into the first polymer particles prior to initiating polymerization of the ethylenically unsaturated monomer; and
    wherein said at least two disparate modes of polymer particles comprise said first mode of first polymer particles and said second mode of second polymer particles.

2. The process according to claim 1 wherein said hydrophobic
    polymerization blocker is provided in an amount in a range from 0.1 to 10 weight %, based on a weight of said first polymer particles.

3. The process according to claim 1 further comprising:
    adding at least one of seed polymer particles, surfactant, buffer, and
    combinations thereof to said aqueous first polymer dispersion prior to or concurrent with polymerizing said ethylenically unsaturated monomer.

4. The process according to claim 1 wherein said ethylenically unsaturated monomer is added to said first polymer dispersion as a miniemulsion.

5. The process according to claim 1 wherein said first mode and said second mode differ by at least one of:
    said first polymer particles and said second polymer particles having a difference in glass transition temperature of at least 10° C.;
    said first polymer particles and said second polymer particles having a difference in average particle diameters of at least 50 nanometers;
    said first polymer particles and said second polymer particles having a difference in weight average molecular weights of at least 25,000 g/mole;
    said first polymer particles and said second polymer particles having a difference in particle morphologies; and
    said first polymer particles and said second polymer particles having different polymer compositions.

6. The process according to claim 1 wherein said first polymer particles comprise addition polymers.

7. The process according to claim 1 wherein said first polymer particles comprise condensation polymers.

8. The process according to claim 1 wherein the hydrophobic polymerization blocker is at least one of an alkyl phenol; a polyaromatic; a substituted polyaromatic; an ester of an unsaturated fatty acid; an alkyl, a hydroxy alkyl, or an alkoxy ester of linoleic acid; an alkyl, a hydroxy alkyl, or an alkoxy ester of linolenic acid; and a $C_1$ to $C_{12}$ derivative of dithiobenzoic acid.

9. The process according to claim 1 wherein the hydrophobic polymerization blocker is at least one of galvinoxyl radical, phenol, catechol, naphthalene, anthracene, pyrene, hydroxynaphthalene, hydroxyanthracene, p-benzoquinone, p-naphthaquinone, dithiobenzoic acid phenyl ester, dithiobenzoic acid benzyl ester, dithiobenzoic acid cumyl ester.

10. The process according to claim 1 wherein the hydrophobic polymerization blocker is a chain transfer agent selected from the group consisting of 1,4-cyclohexadiene, terpineol, trichloromethane, a benzyl halide, an allyl halide, a crotyl halide, t-dodecyl mercaptan, an alcohol, isopropanol, isobutanol, lauryl alcohol, t-octyl alcohol, tetrachloroethylene, trichlorobromomethane, and a combination comprising one of more of the foregoing chain transfer agents.

11. A process for preparing an aqueous polymer dispersion comprising at least two disparate modes of polymer particles, comprising:
    providing a first polymer dispersion containing a first mode of first polymer particles dispersed in an aqueous medium,
    adding an inhibitory monomer having a water solubility of less than 0.05 g/100 milliliters of water to said first polymer dispersion; followed by
    adding ethylenically unsaturated monomer to said first polymer dispersion; and
    polymerizing said ethylenically unsaturated monomer in the presence of said first polymer particles to provide a second mode of second polymer particles;
    wherein the inhibitory monomer is allowed at least one minute after adding to partition into the first polymer particles prior to initiating polymerization of the ethylenically unsaturated monomer; and
    wherein said at least two disparate modes comprise said first mode and said second mode.

12. The process according to claim 11 further comprising:
    adding at least one of seed polymer particles, surfactant, buffer, and combinations thereof to said aqueous first polymer dispersion prior to or concurrent with polymerizing said ethylenically unsaturated monomer.

13. The process according to claim 11 wherein said ethylenically unsaturated monomer is added to said first polymer dispersion as a miniemulsion.

14. The process according to claim 11 wherein said first mode and said second mode differ by at least one of:
- said first polymer particles and said second polymer particles having a difference in glass transition temperature of at least 10° C.;
- said first polymer particles and said second polymer particles having a difference in average particle diameters of at least 50 nanometers;
- said first polymer particles and said second polymer particles having a difference in weight average molecular weights of at least 25,000 g/mole;
- said first polymer particles and said second polymer particles having a difference in particle morphologies; and
- said first polymer particles and said second polymer particles having different polymer compositions.

15. The process according to claim 11 wherein said first polymer particles comprise addition polymers.

16. The process according to claim 11 wherein said first polymer particles comprise condensation polymers.

17. The process according to claim 11 wherein the inhibitory monomer is at least one of a 1-alkyl styrene, a 1-aryl styrene, a 2-alkyl styrene, a 2- aryl styrene, an alkyl vinyl ether, and an aryl vinyl ether.

18. The process according to claim 11 wherein the inhibitory monomer is at least one of α-methyl styrene, 1,1-diphenylethylene, stilbene, 1-phenylpentene, trans-crotonitrile, trans-1,2-diphenylethylene, trans-1,2-dibenzoylethylene, trans-1,2-diacetylethylene, methyl 2-tert-butylacrylate, 1-isoprenylnaphthalene, α-stilbazole, 2,4-dimethyl α-methyl styrene, isoprenyltoluene, and a half or full ester of itaconic acid, maleic acid, fumaric acid, and crotonic acid.

19. A process for preparing an aqueous polymer dispersion comprising:
- adding a first ethylenically unsaturated monomer to an aqueous medium;
- polymerizing said first ethylenically unsaturated monomer in said aqueous medium to prepare first polymer particles;
- adding concurrently 0.1 to 10 weight %, based on a weight of said first polymer particles, of an inhibitory monomer and a second ethylenically unsaturated monomer to said aqueous medium; and
- polymerizing said second ethylenically unsaturated monomer in said aqueous medium to prepare second polymer particles;
- wherein the inhibitory monomer is allowed at least one minute after adding to partition into the first polymer particles prior to initiating polymerization of the ethylenically unsaturated monomer; and
- wherein said aqueous polymer dispersion has a particle diameter distribution with a polydispersity of at least 1.5.

20. A process for preparing an aqueous polymer dispersion comprising at least two disparate modes of polymer particles, comprising:
- providing a first polymer dispersion containing a first mode of first polymer particles dispersed in an aqueous medium, wherein the first polymer particles are formed in the absence of a hydrophobic polymerization blocker;
- adding a polymerization blocker to said first polymer dispersion; and
- mixing the polymerization blocker and the first polymer dispersion for at least one minute; followed by
- adding and polymerizing ethylenically unsaturated monomer in the presence of said first polymer particles to provide a second mode of second polymer particles;
- wherein the hydrophobic polymerization blocker has a water solubility of less than 1 gram per 100 milliliters of water; and
- wherein said at least two disparate modes comprise said first mode and said second mode.

* * * * *